W. E. BRACE.
SCREW THREADING DIE.
APPLICATION FILED OCT. 30, 1913.
1,112,762.
Patented Oct. 6, 1914.
Fig. I
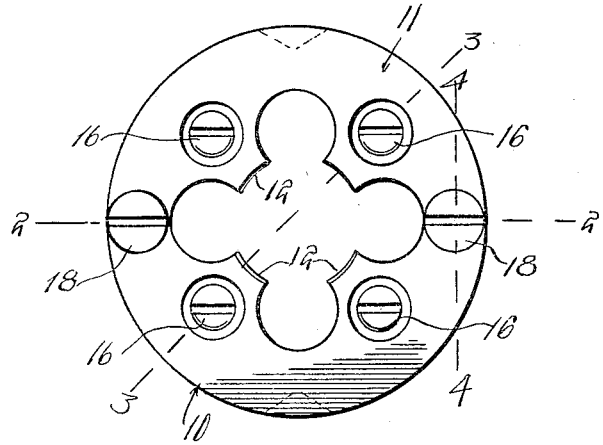
Fig. 2.
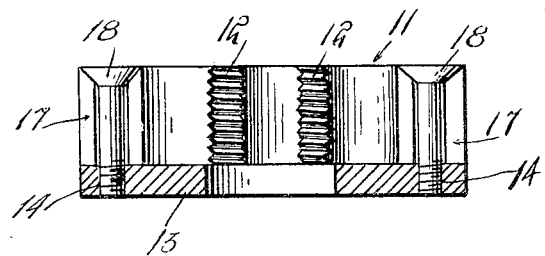
Fig. 3.
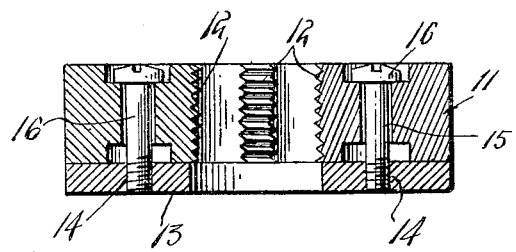
Fig. 4.
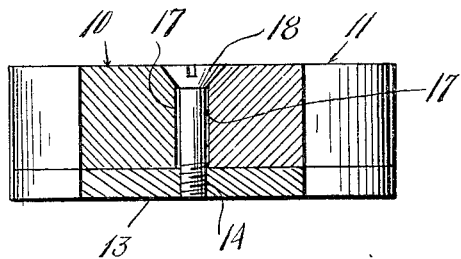
Witnesses
J. C. Simpson
Henry T. Bright
Inventor
W. E. Brace.
By Chandlee & Chandlee
Attorneys

UNITED STATES PATENT OFFICE.

WILLARD E. BRACE, OF ELMIRA, NEW YORK, ASSIGNOR OF ONE-HALF TO R. R. ROCKWELL, OF ELMIRA, NEW YORK.

SCREW-THREADING DIE.

1,112,762.  Specification of Letters Patent.  Patented Oct. 6, 1914.

Application filed October 30, 1913. Serial No. 798,324.

*To all whom it may concern:*

Be it known that I, WILLARD E. BRACE, a citizen of the United States, residing at Elmira, in the county of Chemung, State of New York, have invented certain new and useful Improvements in Screw-Threading Dies; and I do hereby declare the following to be a full, clear, and exact description of the invention, such as will enable others skilled in the art to which it appertains to make and use the same.

This invention relates to screw threading dies.

The object of the invention resides in the provision of a screw threading die which is formed of a plurality of sections capable of adjustment to compensate for wear or to cut screws of different depths and sizes by means of a single die.

A further object of the invention resides in the provision of a screw threading die embodying a plurality of sections which may be readily disassembled to render repairing and sharpening of the die easier.

With the above and other objects in view the invention consists in the details of construction and in the arrangement and combination of parts to be hereinafter more fully described and particularly pointed out in the appended claim.

In describing the invention in detail reference will be had to the accompanying drawings wherein like characters of reference denote corresponding parts in the several views, and in which—

Figure 1 is a plan view of the improved die; Fig. 2, a section on the line 2—2 of Fig. 1; Fig. 3, a section on the line 3—3 of Fig. 1, and Fig. 4, a section on the line 4—4 of Fig. 1.

Referring to the drawings the improved die is shown as comprising sections 10 and 11 being provided as usual with threads 12, forming when put together a female screw for cutting thread. The sections 10 and 11 are secured in operative relation by means of a uniting plate 13 having threaded passages 14 therein for a purpose that will presently appear. The sections 10 and 11 are provided with passages 15 through which are engaged screws 16, the diameters of the passages 15 being in excess of the diameter of the screw. The adjacent edges of the sections 10 and 11 are provided with opposed recesses 17 disposed in substantially mating relation and through which are engaged screws 18. The positions of the threaded passages 14 in the plate 13 correspond to the position of the screws 16 and 18 and in assembling the die the screws 16 and 18 are threaded in corresponding passages 14 of the plate 13.

Owing to the fact that the passages 15 are of greater diameter than the screws 16 it will be obvious that the sections 10 and 11 can be adjusted toward and away from each other and then locked in a desired adjustment by rotating the screws 15 and 18. It will also be obvious that by removing the screws 16 and 18 from the passages 14 the sections 10 and 11 can be readily disassembled for the purpose of repair or sharpening.

What is claimed is:—

A screw threading die comprising a plurality of die members having screw passages therethrough, a uniting plate having threaded passages therethrough corresponding with the screw passages in the die members, screws engaged through the passages in the die members and in corresponding passages of the uniting plate, said passages in the die member being of greater diameter than the screws, and screws threaded in the uniting plate and disposed between adjacent faces of the die members, said last named screws having beveled heads coöperating with beveled surfaces formed on the die members whereby the inward movement of said screws will spread the die members away from each other.

In testimony whereof, I affix my signature, in the presence of two witnesses.

WILLARD E. BRACE.

Witnesses:
ROBERT R. ROCKWELL,
H. S. HOUGHTON.

Copies of this patent may be obtained for five cents each, by addressing the "Commissioner of Patents, Washington, D. C."